(12) United States Patent
Tao et al.

(10) Patent No.: US 10,305,822 B2
(45) Date of Patent: May 28, 2019

(54) SERVICE CHAIN ROUTING METHOD AND SYSTEM, AND EQUIPMENT IN SYSTEM

(71) Applicant: ZTE Corporation, Shenzhen (CN)

(72) Inventors: Quanjun Tao, Shenzhen (CN); Jianfeng Zhou, Shenzhen (CN); Se Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 87 days.

(21) Appl. No.: 15/300,964

(22) PCT Filed: Sep. 5, 2014

(86) PCT No.: PCT/CN2014/086062
§ 371 (c)(1),
(2) Date: Sep. 30, 2016

(87) PCT Pub. No.: WO2015/149481
PCT Pub. Date: Oct. 8, 2015

(65) Prior Publication Data
US 2017/0034080 A1    Feb. 2, 2017

(30) Foreign Application Priority Data
Apr. 4, 2014   (CN) .......................... 2014 1 0136043

(51) Int. Cl.
*H04L 12/741*   (2013.01)
*H04L 12/939*   (2013.01)
(Continued)

(52) U.S. Cl.
CPC ........ *H04L 49/552* (2013.01); *H04L 12/6418* (2013.01); *H04L 45/20* (2013.01);
(Continued)

(58) Field of Classification Search
CPC ... H04L 63/105; H04L 47/782; H04L 47/125; H04L 45/38; H04L 41/50; H04L 63/20;
(Continued)

(56) References Cited

U.S. PATENT DOCUMENTS 7,830,883 B1   11/2010   Fromm et al.
2002/0110087 A1   8/2002   Zelig et al.
(Continued)

FOREIGN PATENT DOCUMENTS

CN   101360042 A   2/2009
CN   102238059 A   11/2011
(Continued)

OTHER PUBLICATIONS

International Search Report for corresponding application PCT/CN2014/086062 filed on Sep. 5, 2014; dated Jan. 9, 2015.
(Continued)

*Primary Examiner* — Jung Liu
(74) *Attorney, Agent, or Firm* — Cantor Colburn LLP

(57) ABSTRACT

The present disclosure discloses a service chain routing method and system, and equipment in the system, wherein, the service chain routing method includes that: a relay node receives a first data message forwarded by a switching node, wherein the first data message is a message sent to a next-hop node which does not support service chain routing, and the relay node forms a binding relationship with the next-hop node; after determining that a type of the next-hop node is a service node, the relay node deletes a service chain identifier in the first data message; and the relay node sends the first data message in which the service chain identifier is deleted to the switching node, as to the switching node to forward, according to the binding relationship, the first data message in which the service chain identifier is deleted to the next-hop node.

16 Claims, 13 Drawing Sheets

(51) Int. Cl.
*H04L 12/64* (2006.01)
*H04L 12/733* (2013.01)
*H04L 12/715* (2013.01)
*H04L 12/721* (2013.01)

(52) U.S. Cl.
CPC ............ *H04L 45/64* (2013.01); *H04L 45/127* (2013.01); *H04L 45/74* (2013.01)

(58) Field of Classification Search
CPC ... H04L 47/14; H04L 47/2408; H04L 45/745; H04L 2212/00; H04L 12/6418; H04L 12/66; H04L 45/42; H04L 41/08
See application file for complete search history.

(56) References Cited

U.S. PATENT DOCUMENTS

| | | |
|---|---|---|
| 2009/0279550 A1 | 11/2009 | Romrell et al. |
| 2010/0036954 A1 | 2/2010 | Sakata et al. |
| 2010/0080226 A1 | 4/2010 | Khalid et al. |
| 2012/0124213 A1 | 5/2012 | Radia et al. |
| 2014/0050223 A1 | 2/2014 | Foo et al. |
| 2014/0092738 A1* | 4/2014 | Grandhi ................. H04L 47/52 370/235 |
| 2014/0334295 A1* | 11/2014 | Guichard ............ H04L 47/2475 370/230 |
| 2015/0063102 A1* | 3/2015 | Mestery ................. H04L 41/12 370/230 |
| 2015/0103827 A1* | 4/2015 | Quinn ..................... H04L 45/74 370/392 |
| 2015/0121476 A1* | 4/2015 | Zheng ..................... H04L 45/02 726/4 |
| 2015/0222640 A1* | 8/2015 | Kumar .................. H04L 47/782 370/230 |
| 2015/0236948 A1* | 8/2015 | Dunbar .................. H04L 45/22 370/225 |
| 2016/0099874 A1* | 4/2016 | Hu ....................... H04L 12/6418 370/236 |
| 2016/0308981 A1* | 10/2016 | Cortes Gomez ........ H04L 67/16 |

FOREIGN PATENT DOCUMENTS

| | | |
|---|---|---|
| CN | 102571856 A | 7/2012 |
| EP | 1853004 A1 | 11/2007 |
| JP | 2010050718 A | 3/2010 |
| WO | 2007033179 A2 | 3/2007 |
| WO | 2011114318 A1 | 9/2011 |

OTHER PUBLICATIONS

Chinese Application No. CN201410136043, Search Report dated Apr. 20, 2018, 1 page.
EP Application No. 14888198.0, Search Report dated Sep. 11, 2017, 15 pages.

* cited by examiner

SERVICE CHAIN ROUTING METHOD AND SYSTEM, AND EQUIPMENT IN SYSTEM

TECHNICAL FIELD

The present disclosure relates to the field of communication, and in particular to a service chain routing method and system, and equipment in the system.

BACKGROUND

At present, an operating company reduces network bandwidth pressure in a manner of deploying a mobile value-added service network to improve Quality of Experience (QoE) of a user, and provides value-added services. A service link of a mobile value-added service network mainly includes two modes as shown in FIG. 1:

Mode 1: service enablers are statistically linked together, traffic is required to pass through all the service enablers in the service link, and a mobile gateway usually adopts Access Point Names (APNs) to distinguish different service links; and Mode 2: all the service enablers are connected to a centralized traffic routing controller, and after being processed by each service enabler, the traffic returns to the centralized controller to determine a next hop.

In mode 1, a network topology among the service enablers corresponding to each APN is relatively static, even the service enablers are fixedly connected in series to form a service chain, adding or removing a service enabler or simply changing a logic of the service chain may cause a change in the network topology, and may bring many problems to service deployment and management of an operating company. Dependence of the network topology directly causes manual configuration complexity and causes the service enablers merely to be deployed according to a set sequence without changes (although there are no limits made to an execution sequence of many service enablers), which makes it difficult to achieve adaptability to elastic and rapid service deployment changes; and in mode 2, a CAPital eXpenditure (CAPX) is relatively high, and all the traffic always determines the next hop by the centralized controller, which may cause existence of a repeated function with a packet gateway.

In order to solve the problem, a service chain routing solution is proposed in the industry, and as shown in FIG. 1, the solution includes the following network element equipment:

traffic classification network element equipment, mainly responsible for performing service identification and service chain selection on a received data message and inserting a corresponding service chain label into the data message, specifically referring to FIG. 2;

service orchestration network element equipment, mainly responsible for orchestrating a sequence of service nodes which are connected in series in a service chain;

network control network element equipment, mainly responsible for maintaining and managing a network topology and service chain routing table of a mobile value-added service network; and a switch, mainly responsible for receiving the data message and forwarding the data message according to the service chain routing table.

However, not all nodes of a mobile value-added service network support service chain routing, as shown in FIG. 3 and FIG. 4, service node 2 in FIG. 3 does not support a service chain routing mechanism, which may cause a routing failure of service chain path 2, and switch 2 in FIG. 4 does not support the service chain routing mechanism, which may also cause a service chain routing failure.

For the problem of high rate of service chain routing failure caused by an incapability of a conventional node, of a mobile value-added service network, not supporting a service chain routing mechanism in a related art, there is yet no effective solution.

SUMMARY

The present disclosure provides a service chain routing method and system, and equipment in the system, so as to solve the problem.

According to an embodiment of the present disclosure, a service chain routing method is provided, including: receiving, by a relay node, a first data message forwarded by a switching node, wherein the first data message is a message sent to a next-hop node which does not support service chain routing, and the relay node forms a binding relationship with the next-hop node; after determining that a type of the next-hop node is a service node, deleting, by the relay node, a service chain identifier in the first data message; and sending, by the relay node, the first data message in which the service chain identifier is deleted to the switching node, as to the switching node to forward, according to the binding relationship, the first data message in which the service chain identifier is deleted to the next-hop node.

In an example embodiment, deleting, by the relay node, the service chain identifier from the first data message includes: storing, by the relay node, a corresponding relationship between an address quintuple and service chain identifier in the first data message, wherein the address quintuple includes: a destination Internet Protocol (IP) address, a destination port, a source IP address, a source port and a protocol number; and deleting, by the relay node, the service chain identifier from the first data message.

In an example embodiment, after sending, by the relay node, the first data message in which the service chain identifier is deleted to the switching node, including: receiving, by the relay node, a second data message forwarded by the switching node, wherein the second data message is a message returned by the next-hop node after message processing; adding, by the relay node, the service chain identifier in the first data message into the second data message; and forwarding, by the relay node, the second data message into which the service chain identifier is added to the switching node.

In an example embodiment, adding, by the relay node, the service chain identifier in the first data message into the second data message includes: acquiring, by the relay node, an address quintuple in the second data message; searching, by the relay node, a corresponding relationship set to which the stored corresponding relationship belongs, for whether there is a corresponding service chain identifier corresponding to the address quintuple in the second data message or not; when a search result is that there is the corresponding service chain identifier corresponding to the address quintuple in the second data message, adding, by the relay node, the found service chain identifier into the second data message, and deleting the corresponding relationship in the corresponding relationship set; and when the search result is that there is no the corresponding service chain identifier corresponding to the address quintuple in the second data message, determining, by the relay node, that the next-hop node has modified the address quintuple during message processing, acquiring the address quintuple in the first data message from the next-hop node, acquiring the service chain identifier in the first data message according to the corresponding relationship, and adding the acquired service chain identifier into the second data message.

In an example embodiment, the binding relationship is an address tunnel binding relationship configured for the relay node and the next-hop node in a manner of pre-configuring for the switching node or in a manner of sending by a network control node a notice to the switching node.

In an example embodiment, the binding relationship is an address tunnel binding relationship set for the relay node and the next-hop node by the network control node in a manner of modifying service chain routing information.

In an example embodiment, before modifying, by the network control node the service chain routing information, including: finding, by the switching node, that the first data message contains the service chain identifier, and determining, according to the service chain routing information, that the next-hop node does not support service chain routing; sending, by the switching node, an event report to the network control node; and allocating, by the network control node, the relay node to the next-hop node according to a network topology, wherein the relay node includes: a virtual machine, service equipment, or an internal component of the network control node.

According to an embodiment of the present disclosure, a service chain routing system is provided, including: a service orchestration node, a network control node, a switching node, a service node and a relay node, wherein the relay node includes: a first receiving component, configured to receive a first data message forwarded by the switching node, wherein the first data message is a message sent to a next-hop node which does not support service chain routing, and the relay node forms a binding relationship with the next-hop node; a first processing component, configured to, after determining that a type of the next-hop node is a service node, delete a service chain identifier in the first data message; and a first sending component, configured to send the first data message in which the service chain identifier is deleted to the switching node, as to the switching node to forward, according to the binding relationship, the first data message in which the service chain identifier is deleted to the next-hop node.

In an example embodiment, the first processing component includes: a storage element, configured to store a corresponding relationship between an address quintuple and service chain identifier in the first data message, wherein the address quintuple includes: a destination Internet Protocol (IP) address, a destination port, a source IP address, a source port and a protocol number; and a deletion element, configured to delete the service chain identifier from the first data message.

In an example embodiment, the relay node further includes: a second receiving component, configured to receive a second data message forwarded by the switching node, wherein the second data message is a message returned by the next-hop node after message processing; a second processing component, configured to add the service chain identifier in the first data message into the second data message; and a second sending component, configured to forward the second data message into which the service chain identifier is added to the switching node.

In an example embodiment, the second processing component includes: an acquisition element, configured to acquire an address quintuple in the second data message; a searching element, configured to search a corresponding relationship set to which the stored corresponding relationship belongs, for whether there is a corresponding service chain identifier corresponding to the address quintuple in the second data message or not; a first processing element, configured to, when a search result of the searching element is that there is the corresponding service chain identifier corresponding to the address quintuple in the second data message, add the found service chain identifier into the second data message, and delete the corresponding relationship in the corresponding relationship set; and a second processing element, configured to, when the search result of the searching element is that there is no the corresponding service chain identifier corresponding to the address quintuple in the second data message, determine that the next-hop node has modified the address quintuple during message processing, acquire the address quintuple in the first data message from the next-hop node, acquire the service chain identifier in the first data message according to the corresponding relationship, and add the acquired service chain identifier into the second data message.

In an example embodiment, the binding relationship is an address tunnel binding relationship configured for the relay node and the next-hop node in a manner of pre-configuring for the switching node or in a manner of sending by a network control node a notice to the switching node.

In an example embodiment, the binding relationship is an address tunnel binding relationship set for the relay node and the next-hop node by the network control node in a manner of modifying service chain routing information.

In an example embodiment, the switching node includes: a determination component, configured to find that the first data message contains the service chain identifier, and determine, according to the service chain routing information, that the next-hop node does not support service chain routing; a sending component, configured to send an event report to the network control node; and the network control node includes: an allocation component, configured to allocate the relay node to the next-hop node according to a network topology, wherein the relay node includes: a virtual machine, service equipment, or an internal component of the network control node.

According to an embodiment of the present disclosure, a service chain routing method is provided, including: receiving, by a first relay node, a data message forwarded by a switching node, wherein the data message is a message sent to a next-hop node which does not support service chain routing, and the first relay node forms a binding relationship with the next-hop node; after determining that a type of the next-hop node is a switching node, encapsulating, by the first relay node, address information of a second relay node in the data message, wherein the second relay node forms a binding relationship with the next-hop node; and sending, by the first relay node, the data message in which the address information is encapsulated to the second relay node, as to the second relay node to delete the address information in the received data message and forward the data message in which the address information is deleted to the switching node which supports service chain routing.

In an example embodiment, before receiving, by the first relay node, the data message forwarded by the switching node, including: receiving, by the first relay node, the address information of the second relay node from a network control node.

In an example embodiment, the binding relationship is an address tunnel binding relationship configured for the first relay node, the second relay node and the next-hop node in a manner of pre-configuring for the switching node or in a manner of sending by the network control node a notice to the switching node.

In an example embodiment, the binding relationship is an address tunnel binding relationship set for the first relay node, the second relay node and the next-hop node by the network control node in a manner of modifying service chain routing information.

In an example embodiment, before receiving, by the first relay node, the address information of the second relay node from the network control node, including: finding, by the switching node, that the data message contains a service chain identifier, and determining, according to the service chain routing information, that the next-hop node does not support service chain routing; sending, by the switching node, an event report to the network control node; and allocating, by the network control node, the first relay node and the second relay node to the next-hop node according to a network topology, wherein the second relay node refers to a relay node directly connected with the switching node which supports service chain routing.

In an example embodiment, when the second relay node is not administered by the network control node, the network control node sends an allocation request to a network control node which administers the second relay node to obtain a right of using the second relay node and the address information of the second relay node.

According to an embodiment of the present disclosure, a service chain routing system is provided, including: a service orchestration node, a network control node, a switching node, a service node, a first relay node and a second relay node, wherein the first relay node includes: a first receiving component, configured to receive a data message forwarded by the switching node, wherein the data message is a message sent to a next-hop node which does not support service chain routing, and the first relay node forms a binding relationship with the next-hop node; a first processing component, configured to, after determining that a type of the next-hop node is a switching node, encapsulate address information of the second relay node in the data message, wherein the second relay node forms a binding relationship with the next-hop node; and a second processing component, configured to send the data message in which the address information is encapsulated to the second relay node, as to the second relay node to delete the address information in the received data message and forward the data message in which the address information is deleted to the switching node which supports service chain routing.

In an example embodiment, the first relay node further includes: a second receiving component, configured to receive the address information of the second relay node from the network control node.

In an example embodiment, the binding relationship is an address tunnel binding relationship configured for the first relay node, the second relay node and the next-hop node in a manner of pre-configuring for the switching node or in a manner of sending by the network control node a notice to the switching node.

In an example embodiment, the binding relationship is an address tunnel binding relationship set for the first relay node, the second relay node and the next-hop node by the network control node in a manner of modifying service chain routing information.

In an example embodiment, the switching node includes: a determination component, configured to find that the data message contains a service chain identifier, and determine, according to the service chain routing information, that the next-hop node does not support service chain routing; a first sending component, configured to send an event report to the network control node; and the network control node includes: an allocation component, configured to allocate the first relay node and the second relay node to the next-hop node according to a network topology, wherein the second relay node refers to a relay node directly connected with the switching node which supports service chain routing.

In an example embodiment, the network control node further includes: a second sending component, configured to, when the second relay node is not administered by the network control node, send an allocation request to a network control node which administers the second relay node to obtain a right of using the second relay node and the address information of the second relay node.

According to an embodiment of the present disclosure, a service orchestration network element equipment is provided, including: a collection component, configured to collect service chain routing capability information of all service nodes in a service chain; a screening component, configured to screen, according to the service chain routing capability information, a service node which does not support a service chain routing capability; and a notification component, configured to notify the service node which does not support the service chain routing capability to network control network element equipment as to the network control network element equipment to set, a state of a port of a switching node connected with the service node which does not support the service chain routing capability, into a state of not supporting service chain routing.

According to an embodiment of the present disclosure, a network control network element equipment is provided, including: a collection component, configured to collect service chain routing capability information of all switching nodes in a mobile value-added service network; a screening component, configured to screen, according to the service chain routing capability information, a switching node which does not support a service chain routing capability; and a setting component, configured to set, according to a network topology, a state of a port of a switching node connected with the switching node which does not support the service chain routing capability, into a state of not supporting service chain routing.

According to an embodiment of the present disclosure, a switch is provided, including: a determination component, configured to, when data forwarding to a next-hop node fails or there is no response, determine that the next-hop node does not support a service chain routing capability; a reporting component, configured to report, port state information which indicates that the next-hop node does not support the service chain routing capability, to network control network element equipment, as to the network control network element equipment to determine, according to a predetermined strategy and the port state information, that the next-hop node really does not support the service chain routing capability; a receiving component, configured to receive a response message returned by the network control network element equipment, wherein the response message is used for notifying the switch to set a state of a port connected with the next-hop node into a state of not supporting service chain routing; and a setting component, configured to set, according to the response message, a state of the switch port connected with the next-hop node into the state of not supporting service chain routing.

According to the present disclosure, a manner of additionally arranging the relay node in a conventional mobile value-added service network deployed by an operating company and functionally extending and defining other nodes is adopted, so that the problem of high rate of service chain routing failure caused by an incapability of a conventional node of the mobile value-added service network in supporting a service chain routing mechanism in the related art is solved, the relay node may be adopted to forward the data message forwarded by the switching node to the next-hop service node when the next-hop node which does not support the service chain routing capability is a service node, the relay node may be adopted to forward the data message forwarded by the switching node to the next-hop switching node when the next-hop node which does not support the service chain routing capability is a switching node, and the effects of increasing a success probability of service chain routing and improving the service chain routing mechanism are further achieved.

BRIEF DESCRIPTION OF THE DRAWINGS

The drawings described here are adopted to provide further understanding of the present disclosure, and form a part of the present disclosure. Schematic embodiments of the present disclosure and descriptions thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflicts.

Figure 5:
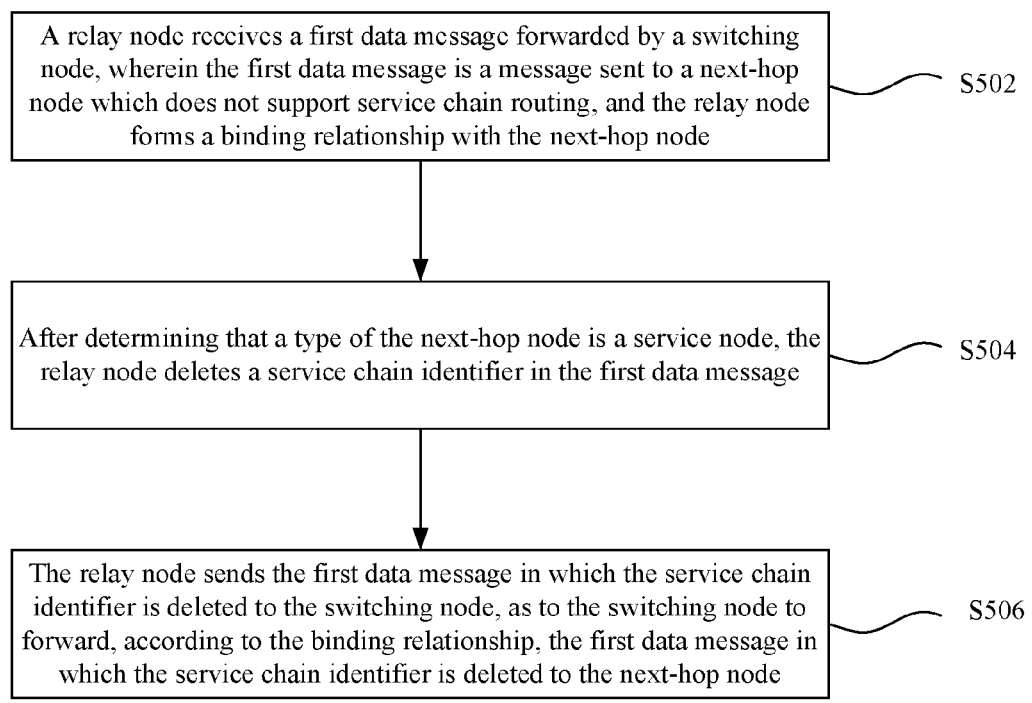
FIG. 5 is a flowchart of a service chain routing method according to embodiment 1 of the present disclosure.

Embodiment 1 of the present disclosure provides a service chain routing method. FIG. 5 is a flowchart of a service chain routing method according to embodiment 1 of the present disclosure, and as shown in FIG. 5, the method mainly includes the following steps (Step 502 to Step 506):

Step 502: a relay node receives a first data message forwarded by a switching node, wherein the first data message is a message sent to a next-hop node which does not support service chain routing, and the relay node forms a binding relationship with the next-hop node;

Step 504: after determining that a type of the next-hop node is a service node, the relay node deletes a service chain identifier in the first data message; and Step 506: the relay node sends the first data message in which the service chain identifier is deleted to the switching node, as to the switching node to forward, according to the binding relationship, the first data message in which the service chain identifier is deleted to the next-hop node.

By each of the steps, a manner of additionally arranging the relay node in a conventional mobile value-added service network deployed by an operating company and functionally extending and defining other nodes is adopted, and when the next-hop node which does not support a service chain routing capability is a service node, the relay node may be adopted to forward the data message forwarded by the switching node to the next-hop service node, so that a success probability of service chain routing is increased, and a service chain routing mechanism is improved.

In embodiment 1, the operation that the relay node deletes the service chain identifier from the first data message in Step 504 may be implemented in a manner as follows: the relay node stores a corresponding relationship between an address quintuple and service chain identifier in the first data message, wherein the address quintuple includes: a destination IP address, a destination port, a source IP address, a source port and a protocol number; and the relay node deletes the service chain identifier from the first data message.

In embodiment 1, after Step 506 is executed, the relay node may further receive a second data message forwarded by the switching node, wherein the second data message is a message returned by the next-hop node after message processing; the relay node adds the service chain identifier in the first data message into the second data message; and the relay node forwards the second data message into which the service chain identifier is added to the switching node.

In an example embodiment, the operation that the relay node adds the service chain identifier in the first data message into the second data message may be implemented in a manner as follows: the relay node acquires an address quintuple in the second data message at first; the relay node searches a corresponding relationship set to which the stored corresponding relationship belongs, for whether there is a corresponding service chain identifier corresponding to the address quintuple in the second data message or not; when a search result is that there is the corresponding service chain identifier corresponding to the address quintuple in the second data message, the relay node adds the found service chain identifier into the second data message, and deletes the corresponding relationship in the corresponding relationship set; and when the search result is that there is no the corresponding service chain identifier corresponding to the address quintuple in the second data message, the relay node determines that the next-hop node has modified the address quintuple during message processing, acquires the address quintuple in the first data message from the next-hop node, acquires the service chain identifier in the first data message according to the corresponding relationship, and adds the acquired service chain identifier into the second data message.

In embodiment 1, the binding relationship may be implemented in two manners as follows: manner (1): the binding relationship is an address tunnel binding relationship configured for the relay node and the next-hop node in a manner of pre-configuring for the switching node or in a manner of sending by a network control node a notice to the switching node; and manner (2): the binding relationship may be an address tunnel binding relationship set for the relay node and the next-hop node by the network control node in a manner of modifying service chain routing information.

In an example embodiment, in an implementation process of manner (2), before the network control node modifies the service chain routing information, the method may further include that: the switching node finds that the first data message contains the service chain identifier, and determines, according to the service chain routing information, that the next-hop node does not support service chain routing; the switching node sends an event report to the network control node; and the network control node allocates the relay node to the next-hop node according to a network topology, wherein the relay node includes: a virtual machine, service equipment, or an internal component of the network control node.

Figure 6:
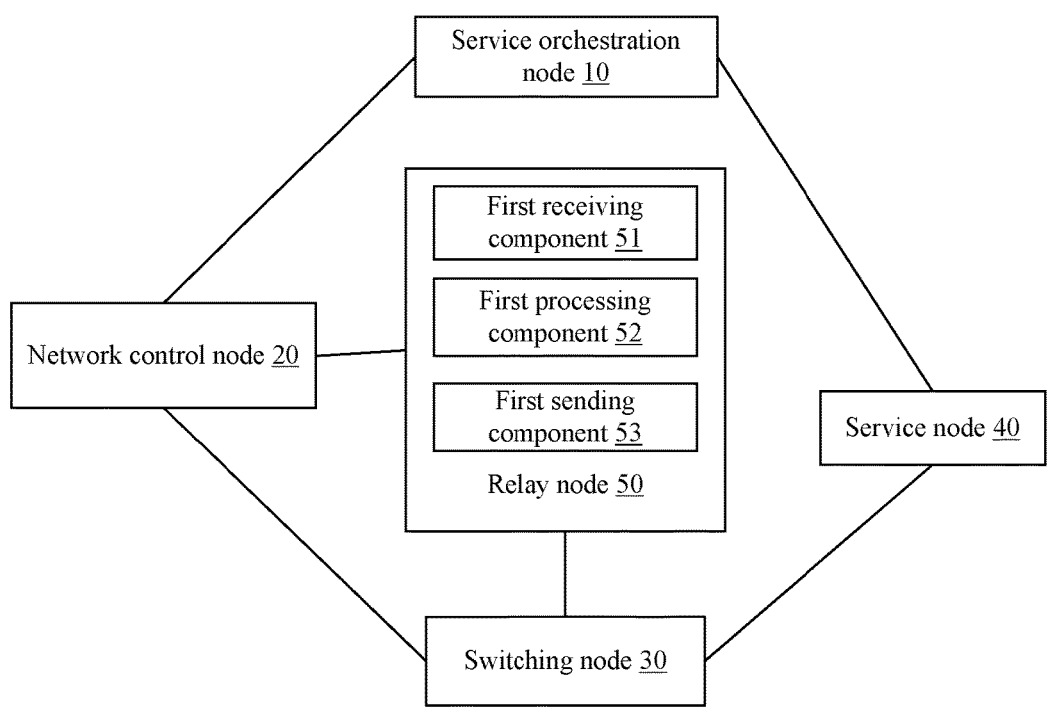
FIG. 6 is a structure block diagram of a service chain routing system according to embodiment 1 of the present disclosure.

Embodiment 1 of the present disclosure provides a service chain routing system, which is configured to implement the service chain routing method provided by embodiment 1. FIG. 6 is a structure block diagram of a service chain routing system according to embodiment 1 of the present disclosure, and as shown in FIG. 6, the system mainly includes: a service orchestration node 10, a network control node 20, a switching node 30, a service node 40 and a relay node 50.

In an example embodiment, the relay node 50 may further include: a first receiving component 51, configured to, receive a first data message forwarded by the switching node 30, wherein the first data message is a message sent to a next-hop node which does not support service chain routing, and the relay node 50 forms a binding relationship with the next-hop node; a first processing component 52, configured to, after determining that a type of the next-hop node is a service node, delete a service chain identifier in the first data message; and a first sending component 53, configured to send the first data message in which the service chain identifier is deleted to the switching node 30, as to the switching node 30 to forward, according to the binding relationship, the first data message in which the service chain identifier is deleted to the next-hop node.

Figure 7:
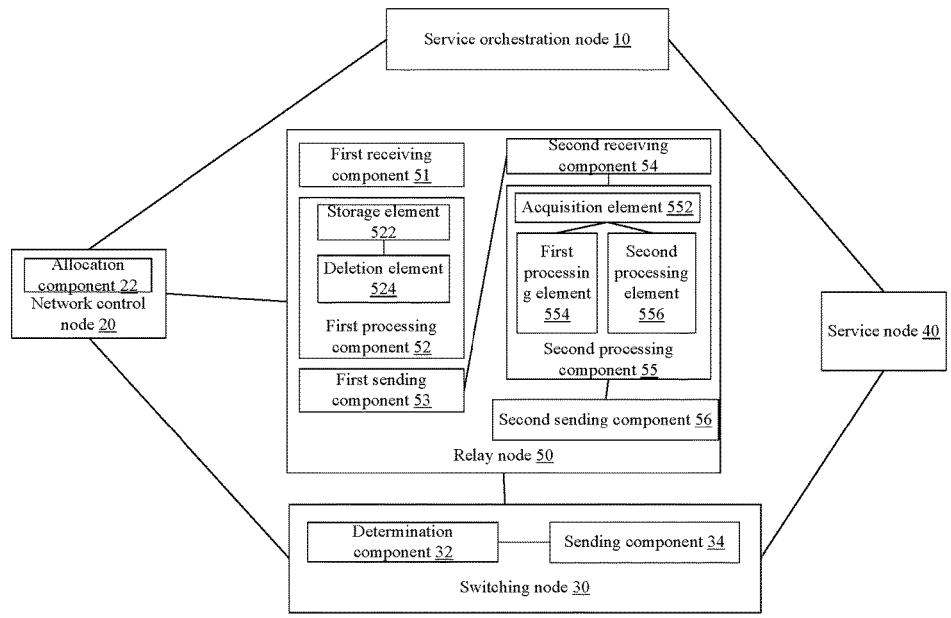
FIG. 7 is a structure block diagram of an example service chain routing system according to embodiment 1 of the present disclosure.

Based on the service chain routing system shown in FIG. 6, embodiment 1 of the present disclosure further provides an example service chain routing system. FIG. 7 is a structure block diagram of an example service chain routing system according to embodiment 1 of the present disclosure, and as shown in FIG. 7, in the example service chain routing system, the first processing component 52 includes: a storage element 522, configured to store a corresponding relationship between an address quintuple and service chain identifier in the first data message, wherein the address quintuple includes: a destination IP address, a destination port, a source IP address, a source port and a protocol number; and a deletion element 524, configured to delete the service chain identifier from the first data message.

In the example service chain routing system, the relay node 50 further includes: a second receiving component 54, configured to receive a second data message forwarded by the switching node 30, wherein the second data message is a message returned by the next-hop node after message processing; a second processing component 55, configured to add the service chain identifier in the first data message into the second data message; and a second sending component 56, configured to forward the second data message into which the service chain identifier is added to the switching node.

Furthermore, the second processing component 55 includes: an acquisition element 552, configured to acquire an address quintuple in the second data message; a searching element, configured to search a corresponding relationship set to which the stored corresponding relationship belongs, for whether there is a corresponding service chain identifier corresponding to the address quintuple in the second data message or not; a first processing element 554, configured to, under the condition that a search result of the searching element is that there is the corresponding service chain identifier corresponding to the address quintuple in the second data message, add the found service chain identifier into the second data message, and delete the corresponding relationship in the corresponding relationship set; and a second processing element 556, configured to, under the condition that the search result of the searching element is that there is no the corresponding service chain identifier corresponding to the address quintuple in the second data message, determine that the next-hop node has modified the address quintuple during message processing, acquire the address quintuple in the first data message from the next-hop node, acquire the service chain identifier in the first data message according to the corresponding relationship, and add the acquired service chain identifier into the second data message.

In an example embodiment, the binding relationship may be implemented in two manners as follows: manner (1): the binding relationship is an address tunnel binding relationship configured for the relay node 50 and the next-hop node in a manner of pre-configuring for the switching node 30 or in a manner of sending by a network control node 20 a notice to the switching node 30; and manner (2): the binding relationship is an address tunnel binding relationship set for the relay node 50 and the next-hop node by the network control node 20 in a manner of modifying service chain routing information.

In the example service chain routing system, the switching node 30 includes: a determination component 32, configured to find that the first data message contains the service chain identifier, and determine, according to the service chain routing information, that the next-hop node does not support service chain routing; a sending component 34, configured to send an event report to the network control node 20; and the network control node 20 includes: an allocation component 22, configured to allocate the relay node 50 to the next-hop node according to a network topology, wherein the relay node 50 may include: a virtual machine, service equipment, or an internal component of the network control node.

Figure 8:
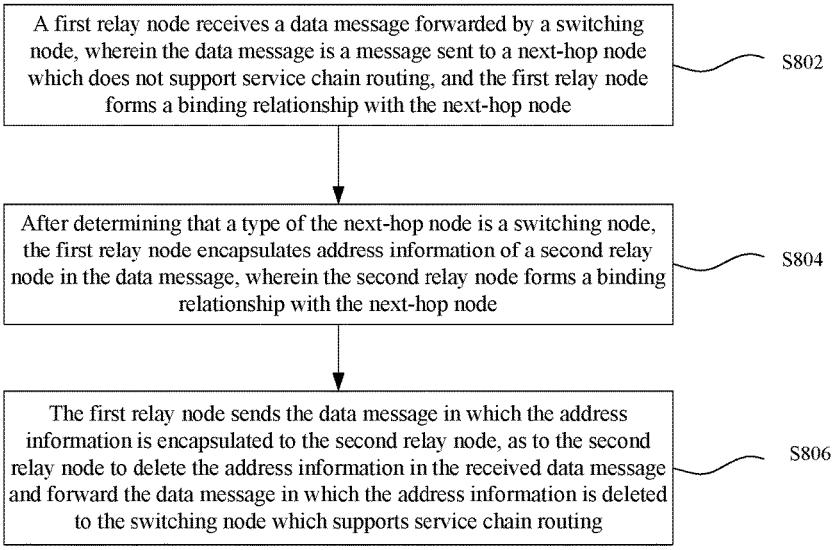
FIG. 8 is a flowchart of a service chain routing method according to embodiment 2 of the present disclosure.

Embodiment 2 of the present disclosure provides a service chain routing method. FIG. 8 is a flowchart of a service chain routing method according to embodiment 2 of the present disclosure, and as shown in FIG. 8, the method mainly includes the following steps (Step 802 to Step 806):

Step 802: a first relay node receives a data message forwarded by a switching node, wherein the data message is a message sent to a next-hop node which does not support service chain routing, and the first relay node forms a binding relationship with the next-hop node;

Step 804: after determining that a type of the next-hop node is a switching node, the first relay node encapsulates address information of a second relay node in the data message, wherein the second relay node forms a binding relationship with the next-hop node; and Step 806: the first relay node sends the data message in which the address information is encapsulated to the second relay node, as to the second relay node to delete the address information in the received data message and forward the data message in which the address information is deleted to the switching node which supports service chain routing.

By each of the steps, a manner of additionally arranging the relay nodes in a conventional mobile value-added service network deployed by an operating company and functionally extending and defining other nodes is adopted, and when the next-hop node which does not support a service chain routing capability is a switching node, the relay node may be adopted to forward the data message forwarded by the switching node to the next-hop switching node, so that a success probability of service chain routing is increased, and a service chain routing mechanism is improved.

In embodiment 2, before Step 802 is executed, the first relay node may receive the address information of the second relay node from a network control node.

In an example embodiment, before the operation that the first relay node receives the address information of the second relay node from the network control node, the method may further include that: the switching node finds that the data message contains a service chain identifier, and determines, according to the service chain routing information, that the next-hop node does not support service chain routing; the switching node sends an event report to the network control node; and the network control node allocates the first relay node and the second relay node to the next-hop node according to a network topology, wherein the second relay node refers to a relay node directly connected with the switching node which supports service chain routing.

In embodiment 2, the binding relationship may be implemented in two manners as follows: manner (1): the binding relationship is an address tunnel binding relationship configured for the first relay node, the second relay node and the next-hop node in a manner of pre-configuring for the switching node or in a manner of sending by the network control node a notice to the switching node; and manner (2): the binding relationship may be an address tunnel binding relationship set for the first relay node, the second relay node and the next-hop node by the network control node in a manner of modifying service chain routing information.

In an example embodiment, when the second relay node is not administered by the network control node, the network control node sends an allocation request to a network control node which administers the second relay node to obtain a right of using the second relay node and the address information of the second relay node.

Figure 9:
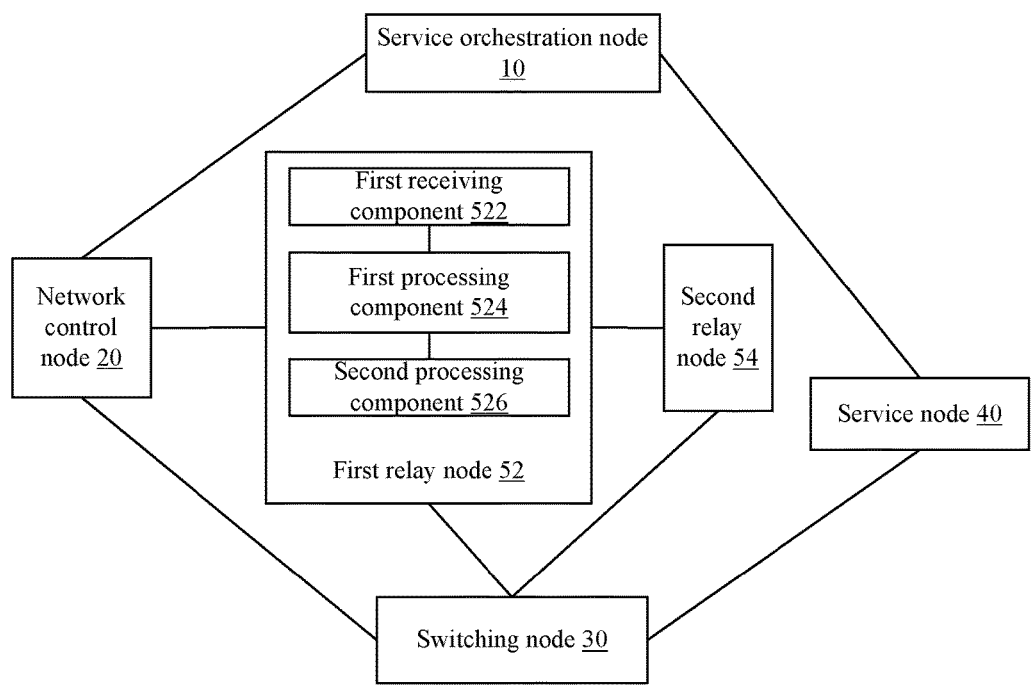
FIG. 9 is a structure block diagram of a service chain routing system according to embodiment 2 of the present disclosure.

Embodiment 2 of the present disclosure provides a service chain routing system, which is configured to implement the service chain routing method provided by embodiment 2. FIG. 9 is a structure block diagram of a service chain routing system according to embodiment 2 of the present disclosure, and as shown in FIG. 9, the system mainly includes: a service orchestration node 10, a network control node 20, a switching node 30, a service node 40, a first relay node 52 and a second relay node 54, wherein the first relay node 52 includes: a first receiving component 522, configured to receive a data message forwarded by the switching node 30, wherein the data message is a message sent to a next-hop node which does not support service chain routing, and the first relay node 52 forms a binding relationship with the next-hop node; a first processing component 524, configured to, after determining that a type of the next-hop node is a switching node, encapsulate address information of the second relay node 54 in the data message, wherein the second relay node forms a binding relationship with the next-hop node; and a second processing component 526, configured to send the data message in which the address information is encapsulated to the second relay node 54, so as to the second relay node 54 to delete the address information in the received data message and forward the data message in which the address information is deleted to the switching node 30 which supports service chain routing.

Figure 10:
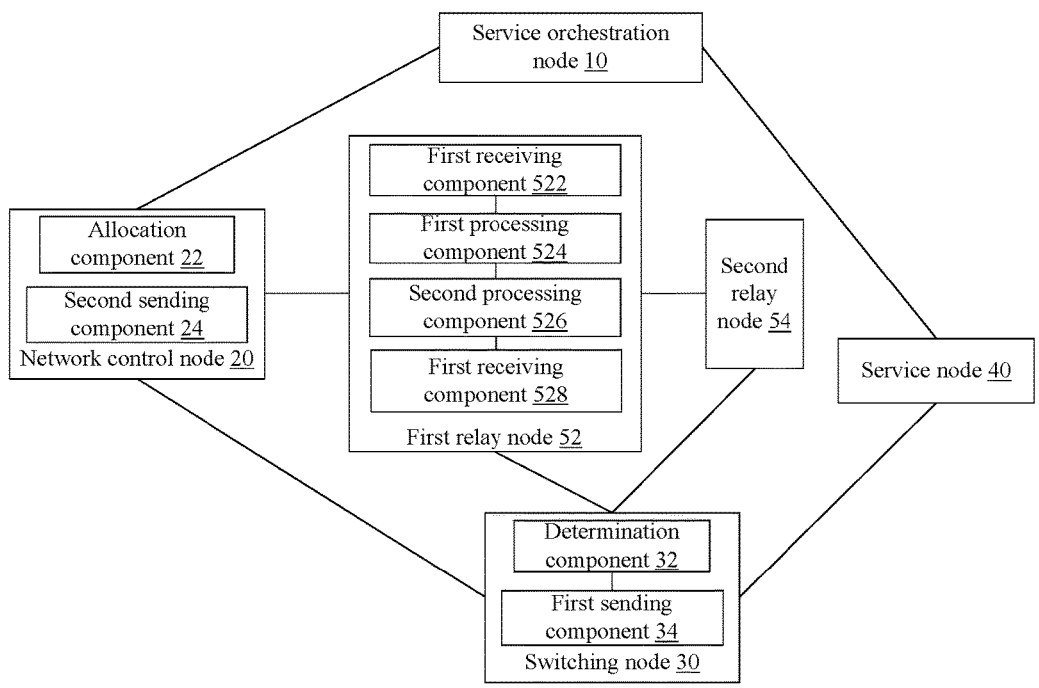
FIG. 10 is a structure block diagram of an example service chain routing system according to embodiment 2 of the present disclosure.

Based on the service chain routing system shown in FIG. 9, embodiment 2 of the present disclosure further provides an example service chain routing system. FIG. 10 is a structure block diagram of an example service chain routing system according to embodiment 2 of the present disclosure, and as shown in FIG. 10, the first relay node 52 may further include: a second receiving component 528, configured to receive the address information of the second relay node 54 from the network control node 20.

In an example embodiment, the binding relationship may be implemented in two manners as follows: manner (1): the binding relationship is an address tunnel binding relationship configured for the first relay node 52, the second relay node 54 and the next-hop node in a manner of pre-configuring for the switching node 30 or in a manner of sending by the network control node 20 a notice to the switching node 30; and manner (2): the binding relationship is an address tunnel binding relationship set for the first relay node 52, the second relay node 54 and the next-hop node by the network control node 20 in a manner of modifying service chain routing information.

In the example service chain routing system, the switching node 30 includes: a determination component 32, configured to find that the data message contains a service chain identifier, and determine, according to the service chain routing information, that the next-hop node does not support service chain routing; a first sending component 34, configured to send an event report to the network control node 20; and the network control node 20 includes: an allocation component 22, configured to allocate the first relay node 52 and the second relay node 54 to the next-hop node according to a network topology, wherein the second relay node 54 refers to a relay node directly connected with the switching node 30 which supports service chain routing.

In an example embodiment, the network control node 20 further includes: a second sending component 24, configured to, when the second relay node 54 is not administered by the network control node 20, send an allocation request to a network control node which administers the second relay node 54 to obtain a right of using the second relay node 54 and the address information of the second relay node.

Figure 11:
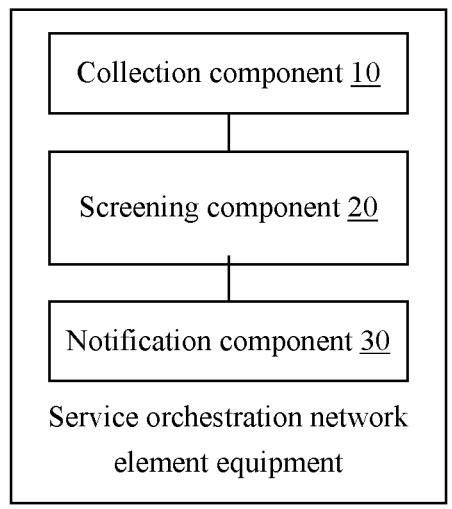
FIG. 11 is a structure block diagram of service orchestration network element equipment according to an embodiment of the present disclosure.

The embodiment of the present disclosure further provides service orchestration network element equipment. FIG. 11 is a structure block diagram of service orchestration network element equipment according to an embodiment of the present disclosure, and as shown in FIG. 11, the service orchestration network element equipment may include: a collection component 10, configured to collect service chain routing capability information of all service nodes in a service chain; a screening component 20, configured to screen, according to the service chain routing capability information, a service node which does not support a service chain routing capability; and a notification component 30, configured to notify the service node which does not support the service chain routing capability to network control network element equipment as to the network control network element equipment to set, a state of a port of a switching node connected with the service node which does not support the service chain routing capability, into a state of not supporting service chain routing.

Figure 12:
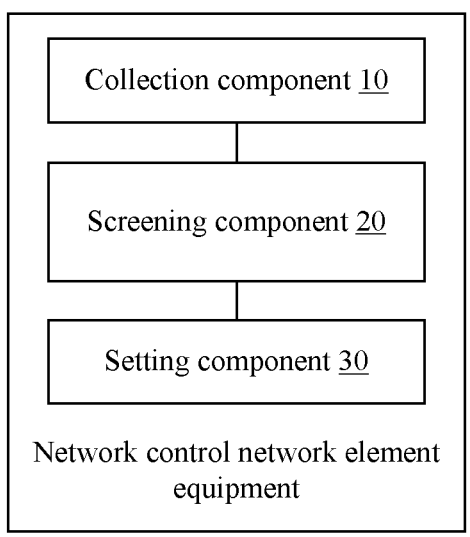
FIG. 12 is a structure block diagram of network control network element equipment according to an embodiment of the present disclosure.

The embodiment of the present disclosure further provides network control network element equipment. FIG. 12 is a structure block diagram of network control network element equipment according to an embodiment of the present disclosure, and as shown in FIG. 12, the network control network element equipment may include: a collection component 10, configured to collect service chain routing capability information of all switching nodes in a mobile value-added service network; a screening component 20, configured to screen, according to the service chain routing capability information, a switching node which does not support a service chain routing capability; and a setting component 30, configured to set, according to a network topology, a state of a port of a switching node connected with the switching node which does not support the service chain routing capability, into a state of not supporting service chain routing.

Figure 13:
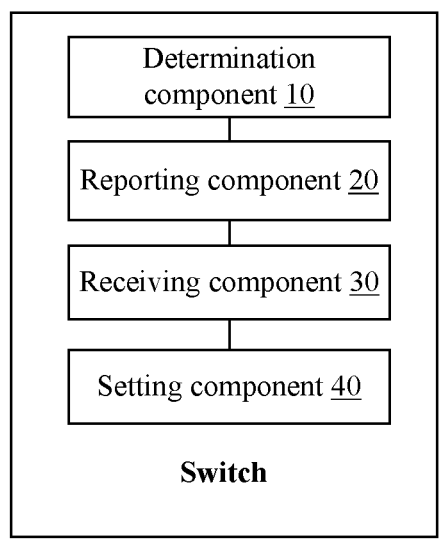
FIG. 13 is a structure block diagram of a switch according to an embodiment of the present disclosure.

The embodiment of the present disclosure further provides a switch. FIG. 13 is a structure block diagram of a switch according to an embodiment of the present disclosure, and as shown in FIG. 13, the switch may include: a determination component 10, configured to, when data forwarding to a next-hop node fails or there is no response, determine that the next-hop node does not support a service chain routing capability; a reporting component 20, configured to report, port state information which indicates that the next-hop node does not support the service chain routing capability, to network control network element equipment, as to the network control network element equipment to determine, according to a predetermined strategy and the port state information, that the next-hop node really does not support the service chain routing capability; a receiving component 30, configured to receive a response message returned by the network control network element equipment, wherein the response message may be used for notifying the switch to set a state of a port connected with the next-hop node into a state of not supporting service chain routing; and a setting component 40, configured to set, according to the response message, a state of the switch port connected with the next-hop node into the state of not supporting service chain routing.

By adopting the service chain routing methods and systems, service orchestration network element equipment, network control network element equipment and/or a switch provided by the abovementioned embodiments, the problem of high rate of service chain routing failure caused by an incapability of a conventional node of a mobile value-added service network in supporting a service chain routing mechanism in the related art is solved, and the effects of increasing a success probability of service chain routing and improving the service chain routing mechanism are achieved.

The service chain routing methods and systems, service orchestration network element equipment, network control network element equipment and/or a switch provided by the abovementioned embodiments will be described and illustrated below with reference to FIG. 14 to FIG. 22 and example embodiments in more detail.

Example Embodiment

Figure 1:
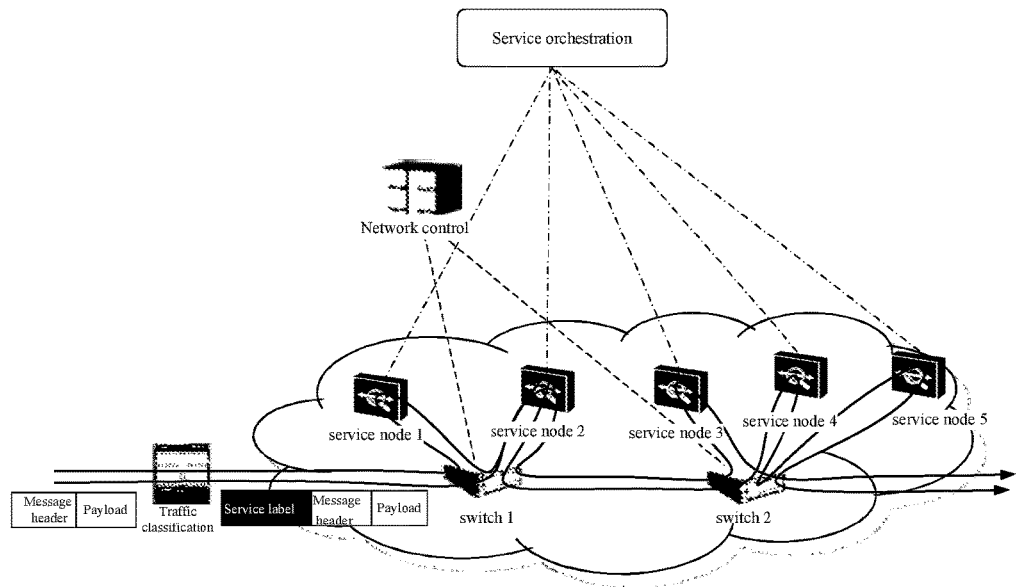
FIG. 1 is a structure diagram of service chain routing of a mobile value-added service network according to the related art.
Figure 2:
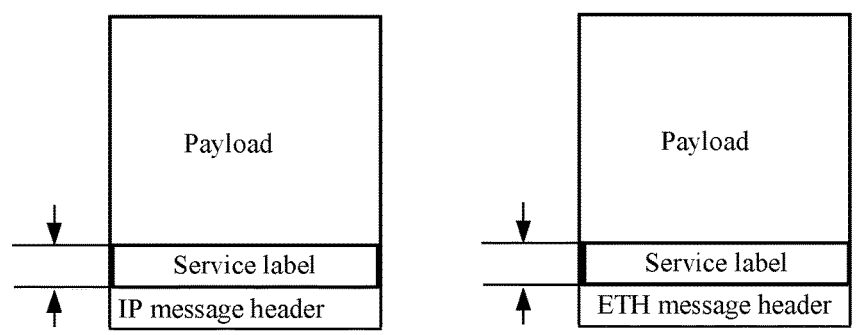
FIG. 2 is a diagram of inserting a service chain label into a data message according to the related art.
Figure 3:
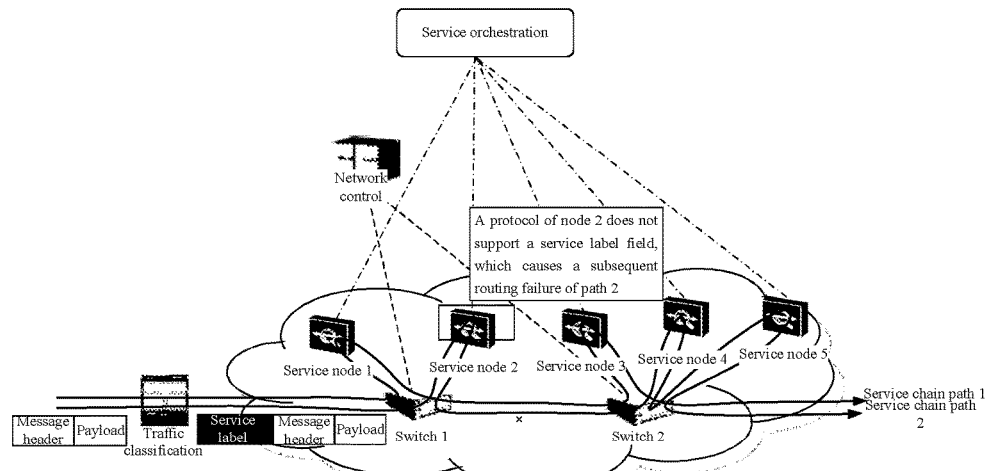
FIG. 3 is a diagram of service chain routing under the condition that a service node does not support a service chain routing mechanism according to the related art.
Figure 4:
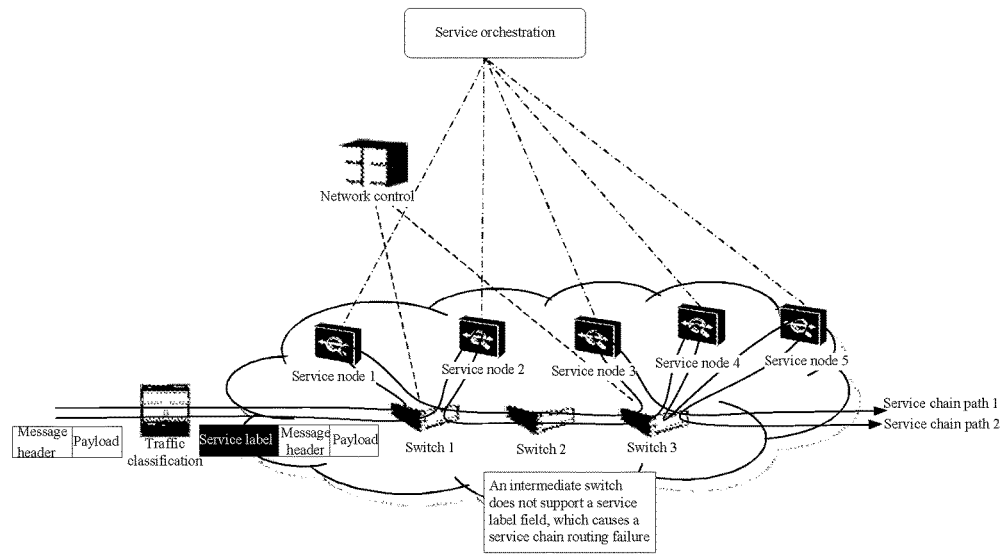
FIG. 4 is a diagram of service chain routing under the condition that a switching node does not support a service chain routing mechanism according to the related art.
Figure 14:
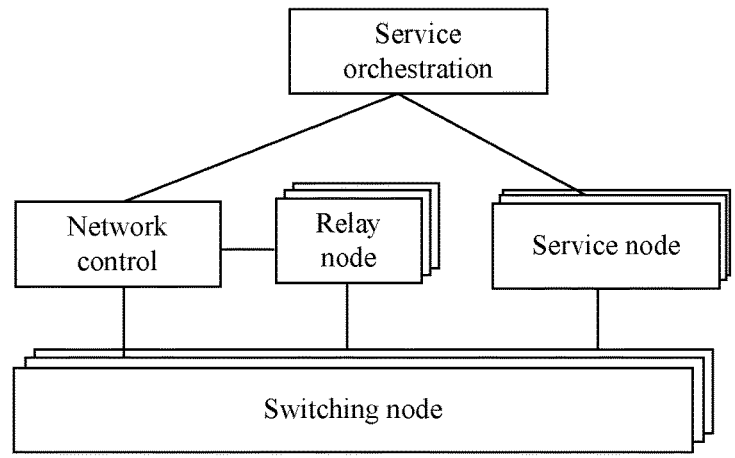
FIG. 14 is a structure diagram of service chain routing of a mobile value-added service network according to an example embodiment of the present disclosure.

FIG. 14 is a structure diagram of service chain routing of a mobile value-added service network according to an example embodiment of the present disclosure. Compared with a structure (shown in FIG. 1) in a background art, the structure shown in FIG. 14 mainly has an additional relay node network element. Since no traffic classification network element is involved in the present example embodiment, for concise description, a traffic classification network element is eliminated in the structure, and the structure mainly includes:

service orchestration network element equipment, which is responsible for, besides orchestrating a sequence of service nodes connected in series in a service chain, collecting capability information (mainly including: whether supporting a service chain routing capability or not) of the service nodes and transmitting the information to network control network element equipment;

the network control network element equipment, which is responsible for, besides maintaining and managing a network topology and service chain routing table of a mobile value-added service network, assigning a relay node to a service node and switching node (switch) which do not support service chain routing;

a switching node (switch), which is responsible for, besides receiving a data message and forwarding the data message according to the service chain routing table, sensing whether a next hop has a capability of supporting service chain routing or not, and when a sense result is that the next hop does not have the capability of supporting service chain routing, forwarding the message to the relay node assigned by the network control network element equipment; and the relay node, which executes corresponding operation according to a type, notified by the network control network element equipment, of a next-hop node, specifically including that: (1) when the type of the next-hop node is a service node, the relay node stores a relationship between an address quintuple and service chain identifier in the received data message, deletes the service chain identifier in the data message, and sends the data message to the switching node for forwarding to the next-hop node, and after receiving a returned data message, the relay node acquires a quintuple in the data message, searches a stored relationship between the address quintuple and the service chain identifier for a corresponding service chain identifier, and if the corresponding service chain identifier is found, adds the corresponding service chain identifier into the data message, deletes a stored corresponding relationship record of the quintuple and the service chain identifier, and forwards the data message to the switching node; and (2) when the type of the next-hop node is a switching node, a first relay node acquires address information of a second relay node, and encapsulates the address information of the second relay node to a header of a data message, a first switching node forwards the data message to the second relay node, and the second relay node strips the address information, encapsulated in the data message, of the second relay node, and forwards the data message to a second switching node.

Figure 15:
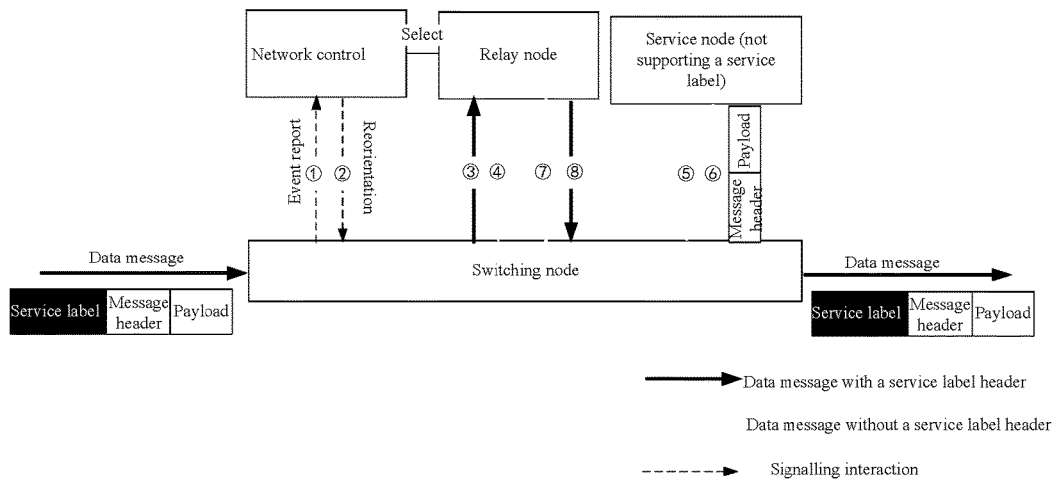
FIG. 15 is a diagram of message processing under the condition that a next-hop node is a service node according to an example embodiment of the present disclosure.

FIG. 15 is a diagram of message processing under the condition that a next-hop node is a service node according to an example embodiment of the present disclosure, and as shown in FIG. 15, when forwarding a message according to a service chain routing table after receiving the data message, a switching node reports an event to a network control node if finding that a next-hop node does not support service chain routing (referring to Step ①);

the network control node selects a relay node serving the next-hop node, notifies the relay node of a type of the next-hop node (note: when the relay node merely processes a service node, network control network element equipment is not required to notify the type of the next-hop node), then modifies a stream table of the switching node to implement address tunnel binding between the relay node and the next-hop service node, and forwards the data message, containing a service chain identifier, to be sent to the service node to the relay node, the relay node forwards the data message not containing the service chain identifier to the service node, and all data messages returned by the service node are forwarded to the relay node (referring to Step ②);

the switching node forwards the data message to the relay node, the data message containing the service chain identifier at this moment (referring to Step ③);

the relay node receives the data message, dynamically stores a corresponding relationship between a quintuple and service chain identifier in the message, wherein the quintuple refers to a destination IP address, a destination port, a source IP address, a source port and a protocol number contained in the message, deletes a field of the service chain identifier in the message, and forwards the message to the switching node (referring to Step ④);

the switching node judges that there is no service chain identifier in the received data message, and forwards the data message to the service node for processing according to a binding relationship between the relay node and the service node (referring to Step ⑤);

the service node receives the message, and returns the data message after processing (referring to Step ⑥);

the switching node returns the returned data message to the relay node according to the binding relationship between the service node and the relay node (referring to Step ⑦);

after receiving the data message, the relay node acquires an address quintuple (which may be called a quintuple for short) in the data message, searches a stored relationship table of the quintuple and the service chain identifier for a corresponding service chain identifier according to the quintuple, and when the corresponding service chain identifier is found, adds the corresponding service chain identifier into the data message, deletes a stored corresponding relationship record of the quintuple and the service chain identifier and forwards the message to the switching node; when the corresponding service chain identifier is not found, it is indicated that the service node has modified an initial quintuple of the message, for example, a Network Address Translation (NAT) type service node, and at this moment, the relay node is required to acquire initial quintuple information from the service node and search the relationship table to acquire the service chain identifier according to the initial quintuple, inserts a service chain identifier field into the data message after acquisition, and forwards the message to the switching node (referring to Step ⑧); and the switching node is responsible for forwarding the message to a hop after a next hop.

Figure 16:
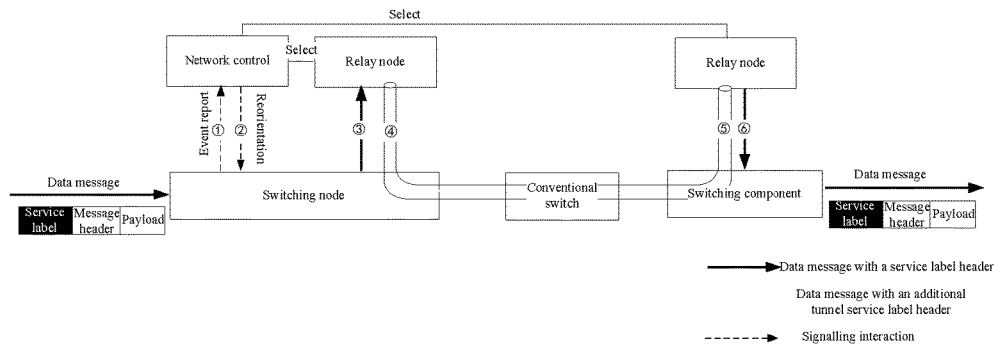
FIG. 16 is a diagram of message processing under the condition that a next-hop node is a switching node according to an example embodiment of the present disclosure.

FIG. 16 is a diagram of message processing under the condition that a next-hop node is a switching node according to an example embodiment of the present disclosure, and as shown in FIG. 16, when forwarding a message according to a service chain routing table after receiving the data message, a switching node reports an event to a network control node when finding that a next-hop node does not support service chain routing (referring to Step ①);

network control network element equipment selects a first relay node (including the first relay node and a second relay node) serving the next-hop node, and acquires address information of the second relay node at first, wherein the second relay node refers to a relay node which may be directly connected with a subsequent switching node supporting service chain routing, and there are two acquisition manners: first, the second relay node is administered by current network control network element equipment, and then the network control network element equipment selects the second relay node according to a network topology and a capability of the switching node; second, the second relay node may not be administered by the current network control network element equipment (called network control network element equipment 1), network control network element equipment 1 is required to request network control network element equipment 2 (network control network element equipment to which the second relay node belongs) to allocate the second relay node (see details in FIG. 22); network control network element equipment 1 acquires and transmits the address information of relay node 2 (i.e. the second relay node) to relay node 1 (i.e. the first relay node), then modifies a stream table of the switching node to implement address tunnel binding between each of relay node 1 and relay node 2 and the next-hop node, and forwards the data message, containing a service chain identifier, to be sent to a service node to relay node 1, relay node 1 transmits the message not containing the service chain identifier to the service node, and all data messages returned by the service node are forwarded to relay node 1 (referring to Step ②);

the switching node forwards the data message to the first relay node, wherein the data message contains the service chain identifier at this moment (referring to Step ③);

the first relay node receives the data message, encapsulates the address information of the second relay node in a header of the message, and forwards the message to the switching node (referring to Step ④);

the switching node forwards the data message to the second relay node (referring to Step ⑤);

the second relay node strips the address information of the second relay node after receiving the data message, and transmits the message to the switching node which supports service chain routing (referring to Step ⑥); and the switching node is responsible for forwarding the message to the corresponding service node.

Figure 17:
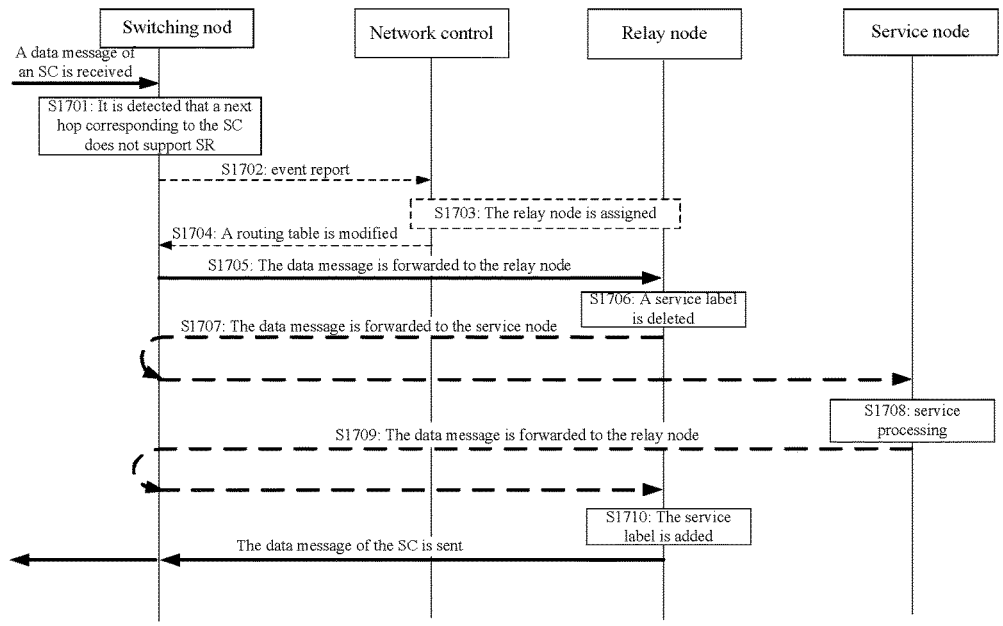
FIG. 17 is a flowchart of message processing under the condition that a next-hop node is a service node according to an example embodiment of the present disclosure.

FIG. 17 is a flowchart of message processing under the condition that a next-hop node is a service node according to an example embodiment of the present disclosure, and as shown in FIG. 17, the flow includes the following steps.

Step 1701: a switching node receives a data message, finds that the message contains a service chain identifier, and then detects, according to a service chain routing table, that a next-hop node to which the message is to be forwarded does not support service chain routing.

Step 1702: the switching node sends an event report to network control node equipment.

Step 1703: the network control node equipment allocates a relay node to the next-hop node according to a network topology, wherein the relay node may be a virtual machine instance, or service equipment, or a component in a network control node.

Here, it is important to note that the first three steps are unnecessary when the switching node has known existence of the relay node (for example, the network control node has notified the switching node, or the switching node has been statistically configured with a relay node (including a built-in relay node)).

Step 1704: the network control node equipment modifies a service chain routing stream table to implement address tunnel binding of the relay node and the next-hop node, and forwards the data message, containing the service chain identifier, to be sent to a service node to the relay node, the relay node forwards the data message not containing the service chain identifier to the service node, and all data messages returned by the service node are forwarded to the relay node.

Step 1705: the switching node forwards the data message to the relay node according to the service chain routing stream table.

Step 1706: after receiving the data message, the relay node dynamically stores a corresponding relationship between a quintuple and service chain identifier in the message (wherein the quintuple refers to a destination IP address, a destination port, a source IP address, a source port and a protocol number contained in the message), deletes a service chain identifier field in the message, and forwards the data message to the switching node.

Step 1707: the switching node determines that there is no service chain identifier in the received data message, and forwards the data message to the service node for processing according to a binding relationship between the relay node and the service node.

Step 1708-Step 1709: the service node receives the data message, and returns the data message after processing, and the switching node returns the returned data message to the relay node according to the binding relationship between the service node and the relay node.

Step 1710: after receiving the data message, the relay node acquires a quintuple in the data message at first, searches a stored relationship table of the address quintuple and the service chain identifier for a corresponding service chain identifier according to the quintuple, and when the corresponding service chain identifier is found, adds the corresponding service chain identifier into the data message, deletes a corresponding relationship record of the quintuple and the service chain identifier and forwards the message to the switching node; and when the corresponding service chain identifier is not found, it is indicated that the service node has modified an initial quintuple of the message (for example, a NAT type service node), and at this moment, the relay node is required to acquire initial quintuple information from the service node and search the relationship table to acquire the service chain identifier according to the initial quintuple, inserts the service chain identifier field into the data message after acquisition, and forwards the message to the switching node for the switching node to forward the message to the next-hop node.

Figure 18:
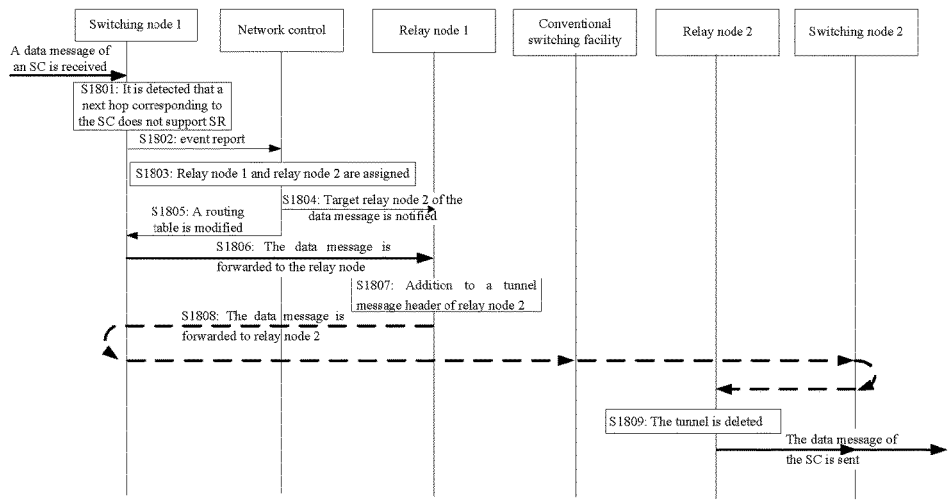
FIG. 18 is a flowchart of message processing under the condition that a next-hop node is a switching node according to an example embodiment of the present disclosure.

FIG. 18 is a flowchart of message processing under the condition that a next-hop node is a switching node according to an example embodiment of the present disclosure, and as shown in FIG. 18, the flow includes the following steps.

Step 1801: after receiving a data message, a switching node finds that a next-hop node does not support service chain routing when forwarding the message according to a service chain routing table.

Step 1802: the switching node reports an event to network control node equipment.

Figure 22:
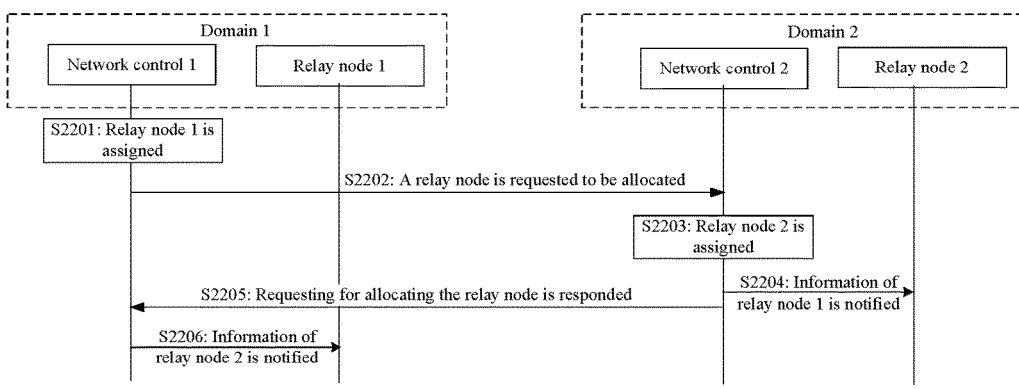
FIG. 22 is a flowchart of processing for a cross-domain relay node in a scenario where a switch does not support service chain routing according to an example embodiment of the present disclosure.

Step 1803: the network control node equipment selects relay nodes serving the next-hop node, and acquires address information of a second relay node, wherein the second relay node refers to a relay node which may be directly connected with a subsequent switching node supporting service chain routing, and there are two acquisition manners: first, the second relay node is administered by current network control network element equipment, and then the network control network element equipment selects the second relay node according to a network topology and a capability of the switching node; and second, the second relay node may not be administered by the current network control network element equipment, network control network element equipment 1 is required to request network control network element equipment 2 to allocate the second relay node (see details in FIG. 22).

Here, it is important to note that the first three steps are unnecessary when the switching node has known existence of the relay nodes (for example, the network control node has notified the switching node, or the switching node has been statistically configured with relay nodes (including built-in relay nodes)).

Step 1804: the network control network element equipment acquires and transmits the address information of relay node 2 to relay node 1.

Step 1805: a stream table of the switching node is modified to implement address tunnel binding of the relay nodes and the next-hop node, the data message, containing a service chain identifier, to be sent to a service node is forwarded to the relay node, the relay node transmits the message not containing the service chain identifier to the service node, and all data messages returned by the service node are forwarded to the relay node.

Step 1806: the switching node forwards the data message to relay node 1 (the data message containing the service chain identifier at this moment).

Step 1807: the relay node receives the data message, encapsulates the address information of the second relay node in a header of the message, and forwards the message to the switching node.

Step 1808: the switching node forwards the data message to the second relay node.

Step 1809: the second relay node strips its own address information after receiving the data message, and transmits the message to the switching node which supports service chain routing, and the switching node be responsible for forwarding the message to the corresponding service node.

Figure 19:
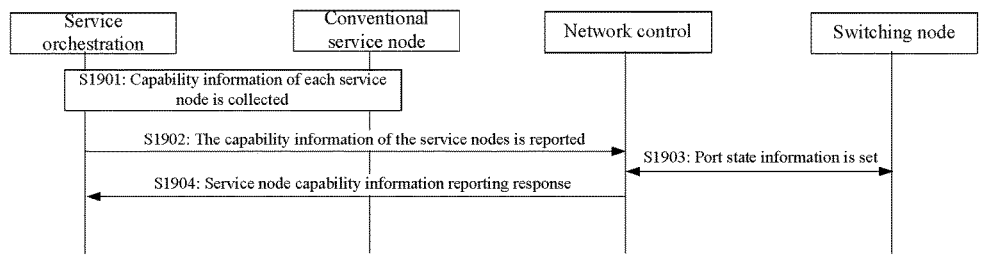
FIG. 19 is a flowchart of manner 1 of setting a state of a port of a switching node according to an example embodiment of the present disclosure.

FIG. 19 is a flowchart of manner 1 of setting a state of a port of a switching node according to an example embodiment of the present disclosure, manner 1 is used for enabling a switch to detect whether a next-hop node supports a service chain routing capability or not, and as shown in FIG. 19, the flow includes the following steps:

Step 1901: a service orchestration node collects capabilities of each service node;

Step 1902: a node which does not support service chain routing is screened and notified to a network control node;

Step 1903: the network control node sets a state of a switch port connected with the service node without a service chain routing capability into a "state of not supporting service chain routing" according to a network topology, and when the switch searches a service chain routing table to find that a state of an output port is the "state of not supporting service chain routing", the flow shown in FIG. 17/18 is triggered; and Step 1904: the network control node returns a service node capability information reporting response.

Figure 20:
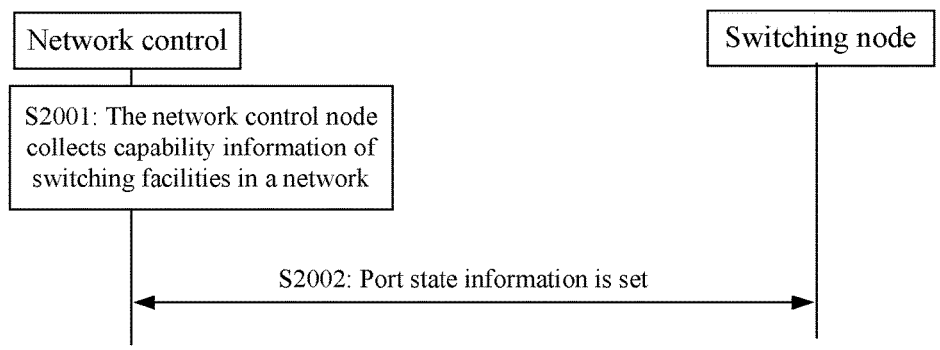
FIG. 20 is a flowchart of manner 2 of setting a state of a port of a switching node according to an example embodiment of the present disclosure.

FIG. 20 is a flowchart of manner 2 of setting a state of a port of a switching node according to an example embodiment of the present disclosure, manner 2 is used for a network control node detecting whether a next-hop switch of a switching node supports a service chain routing capability or not, and as shown in FIG. 20, the flow includes the following steps:

Step 2001: the network control node collects capability information of each switching node in a network, and screens the switching node which does not support service chain routing; and Step 2002: the network control node sets a state of a switch port connected with the switching node without a service chain routing capability into a "state of not supporting service chain routing" according to a network topology.

Figure 21:
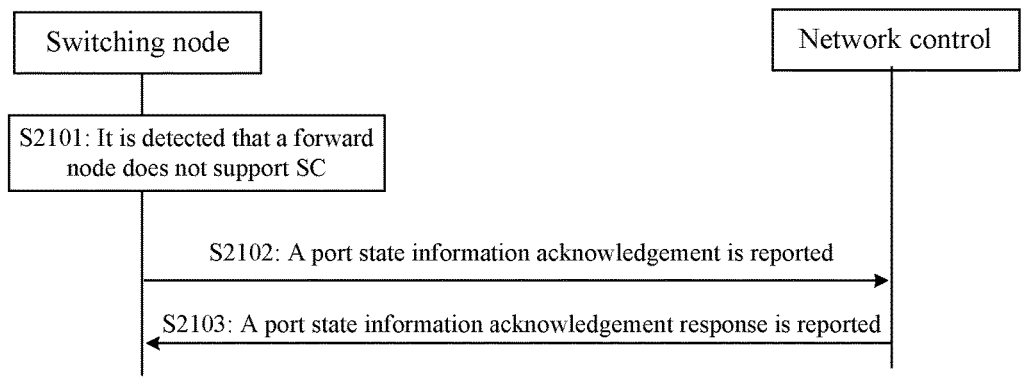
FIG. 21 is a flowchart of manner 3 of setting a state of a port of a switching node according to an example embodiment of the present disclosure.

FIG. 21 is a flowchart of manner 3 of setting a state of a port of a switching node according to an example embodiment of the present disclosure, manner 3 is configured for a switching node to detect whether a next hop supports a service chain routing capability or not, and as shown in FIG. 21, the flow includes the following steps:

Step 2101: when forwarding data, the switching node detects that the next hop does not support service chain routing (for example, there is no response to sent data or the data is failed to be sent);

Step 2102: the switching node reports port state information to a network control node to notify the network control node of a service chain routing failure of the next hop; and Step 2103: the network control node determines that the next hop reported by the switching node really does not support service chain routing according to a strategy (for example, a failure frequency threshold), and replies with a response message to notify the switching node of setting a state of a port into a "state of not supporting service chain routing".

FIG. 22 is a flowchart of processing for a cross-domain relay node in a scenario where a switch does not support service chain routing according to an example embodiment of the present disclosure, and as shown in FIG. 22, the flow includes the following steps:

Step 2201: network control node 1 of service domain 1 receives from a switching node a report about that a next hop does not support service chain routing, and assigns relay node 1 in this domain;

Step 2202: network control node 2 of domain 2 is requested to allocate a relay node;

Step 2203: network control node 2 of domain 2 allocates relay node 2;

Step 2204: information of relay node 1 is notified (this step is an optional step);

Step 2205: a request response containing address information of relay node 2 is returned; and Step 2206: network control node 1 notifies relay node 1 of the collected address information of relay node 2.

It is important to note that each of the abovementioned components may be implemented with hardware. For example: a processor includes each of the abovementioned components, or, each of the abovementioned components is positioned in a processor.

In another embodiment, software is further provided, which is configured to execute the technical solutions of the embodiments and preferred implementation modes.

In another embodiment, a storage medium is further provided, in which the software is stored, the storage medium including, but not limited to: an optical disk, a floppy disk, a hard disk, an erasable memory and the like.

From the above descriptions, it can be seen that the present disclosure has the following technical effects: a manner of additionally arranging the relay node in a conventional mobile value-added service network deployed by an operating company and functionally extending and defining other nodes is adopted, the relay node may be adopted to forward the data message forwarded by the switching node to the next-hop service node when the next-hop node which does not support the service chain routing capability is a service node, and the relay node may be adopted to forward the data message forwarded by the switching node to the next-hop switching node when the next-hop node which does not support the service chain routing capability is a switching node, so that the effects of increasing a success probability of service chain routing and improving a service chain routing mechanism are further achieved.

Obviously, those skilled in the art should know that each component or step of the present disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, the shown or described steps may be executed in sequences different from those described here in some circumstances, or may form each integrated circuit component respectively, or multiple components or steps therein may form a single integrated circuit component for implementation. As a consequence, the present disclosure is not limited to any specific hardware and software combination.

The above is merely the example embodiment of the present disclosure and not intended to limit the embodiment of the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

As mentioned above, the embodiment of the present disclosure provides a service chain routing method and system, and equipment in the system, and has the following beneficial effects: the relay node may be adopted to forward the data message forwarded by the switching node to the next-hop service node when the next-hop node which does not support the service chain routing capability is a service node, and the relay node may be adopted to forward the data message forwarded by the switching node to the next-hop switching node when the next-hop node which does not support the service chain routing capability is a switching node, so that the effects of increasing a success probability of service chain routing and improving a service chain routing mechanism are further achieved.

What is claimed is:

1. A service chain routing method, comprising:
   receiving, by a relay node, a first data message forwarded by a switching node, wherein the first data message is a message sent to a next-hop node which does not support service chain routing, and the relay node forms a binding relationship with the next-hop node;
   after determining that a type of the next-hop node is a service node, deleting, by the relay node, a service chain identifier in the first data message; and
   sending, by the relay node, the first data message in which the service chain identifier is deleted to the switching node, as to the switching node to forward, according to the binding relationship, the first data message in which the service chain identifier is deleted to the next-hop node;
   wherein deleting, by the relay node, the service chain identifier from the first data message comprises:
   storing, by the relay node, a corresponding relationship between an address quintuple and service chain identifier in the first data message, wherein the address quintuple comprises: a destination Internet Protocol (IP) address, a destination port, a source IP address, a source port and a protocol number; and
   deleting, by the relay node, the service chain identifier from the first data message;
   after sending, by the relay node, the first data message in which the service chain identifier is deleted to the switching node, comprising:
   receiving, by the relay node, a second data message forwarded by the switching node, wherein the second data message is a message returned by the next-hop node after message processing;
   adding, by the relay node, the service chain identifier in the first data message into the second data message; and
   forwarding, by the relay node, the second data message into which the service chain identifier is added to the switching node.

2. The method as claimed in claim 1, wherein adding, by the relay node, the service chain identifier in the first data message into the second data message comprises:
   acquiring, by the relay node, an address quintuple in the second data message;
   searching, by the relay node, a corresponding relationship set to which the stored corresponding relationship belongs, for whether there is a corresponding service chain identifier corresponding to the address quintuple in the second data message or not;
   when a search result is that there is the corresponding service chain identifier corresponding to the address quintuple in the second data message, adding, by the relay node, the found service chain identifier into the second data message, and deleting the corresponding relationship in the corresponding relationship set; and when the search result is that there is no the corresponding service chain identifier corresponding to the address quintuple in the second data message, determining, by the relay node, that the next-hop node has modified the address quintuple during message processing, acquiring the address quintuple in the first data message from the next-hop node, acquiring the service chain identifier in the first data message according to the corresponding relationship, and adding the acquired service chain identifier into the second data message.

3. The method as claimed in claim 1, wherein
   the binding relationship is an address tunnel binding relationship configured for the relay node and the next-hop node in a manner of pre-configuring for the switching node or in a manner of sending by a network control node a notice to the switching node;
   or,
   the binding relationship is an address tunnel binding relationship set for the relay node and the next-hop node by the network control node in a manner of modifying service chain routing information.

4. The method as claimed in claim 3, before modifying, by the network control node the service chain routing information, comprising:
   finding, by the switching node, that the first data message contains the service chain identifier, and determining, according to the service chain routing information, that the next-hop node does not support service chain routing;
   sending, by the switching node, an event report to the network control node; and
   allocating, by the network control node, the relay node to the next-hop node according to a network topology, wherein the relay node comprises: a virtual machine, service equipment, or an internal component of the network control node.

5. A service chain routing system, comprising: a service orchestration node, a network control node, a switching node, a service node and a relay node, wherein the relay node comprises:
   a first receiving component, configured to receive a first data message forwarded by the switching node, wherein the first data message is a message sent to a next-hop node which does not support service chain routing, and the relay node forms a binding relationship with the next-hop node;
   a first processing component, configured to, after determining that a type of the next-hop node is a service node, delete a service chain identifier in the first data message; and
   a first sending component, configured to send the first data message in which the service chain identifier is deleted to the switching node, as to the switching node to forward, according to the binding relationship, the first data message in which the service chain identifier is deleted to the next-hop node;
   wherein the first processing component comprises:
   a storage element, configured to store a corresponding relationship between an address quintuple and service chain identifier in the first data message, wherein the address quintuple comprises: a destination Internet Protocol (IP) address, a destination port, a source IP address, a source port and a protocol number; and
   a deletion element, configured to delete the service chain identifier from the first data message;
   wherein the relay node further comprises:

a second receiving component, configured to receive a second data message forwarded by the switching node, wherein the second data message is a message returned by the next-hop node after message processing;

a second processing component, configured to add the service chain identifier in the first data message into the second data message; and a second sending component, configured to forward the second data message into which the service chain identifier is added to the switching node.

6. The system as claimed in claim 5, wherein the second processing component comprises:

an acquisition element, configured to acquire an address quintuple in the second data message;

a searching element, configured to search a corresponding relationship set to which the stored corresponding relationship belongs, for whether there is a corresponding service chain identifier corresponding to the address quintuple in the second data message or not;

a first processing element, configured to, when a search result of the searching element is that there is the corresponding service chain identifier corresponding to the address quintuple in the second data message, add the found service chain identifier into the second data message, and delete the corresponding relationship in the corresponding relationship set; and a second processing element, configured to, when the search result of the searching element is that there is no the corresponding service chain identifier corresponding to the address quintuple in the second data message, determine that the next-hop node has modified the address quintuple during message processing, acquire the address quintuple in the first data message from the next-hop node, acquire the service chain identifier in the first data message according to the corresponding relationship, and add the acquired service chain identifier into the second data message.

7. The system as claimed in claim 5, wherein the binding relationship is an address tunnel binding relationship configured for the relay node and the next-hop node in a manner of pre-configuring for the switching node or in a manner of sending by a network control node a notice to the switching node;

or, the binding relationship is an address tunnel binding relationship set for the relay node and the next-hop node by the network control node in a manner of modifying service chain routing information.

8. The system as claimed in claim 7, wherein the switching node comprises:

a determination component, configured to find that the first data message contains the service chain identifier, and determine, according to the service chain routing information, that the next-hop node does not support service chain routing; a sending component, configured to send an event report to the network control node; and the network control node comprises:

an allocation component, configured to allocate the relay node to the next-hop node according to a network topology, wherein the relay node comprises: a virtual machine, service equipment, or an internal component of the network control node.

9. A service chain routing method, comprising:

receiving, by a first relay node, a data message forwarded by a switching node, wherein the data message is a message sent to a next-hop node which does not support service chain routing, and the first relay node forms a binding relationship with the next-hop node;

after determining that a type of the next-hop node is a switching node, encapsulating, by the first relay node, address information of a second relay node in the data message, wherein the second relay node forms a binding relationship with the next-hop node; and sending, by the first relay node, the data message in which the address information is encapsulated to the second relay node, as to the second relay node to delete the address information in the received data message and forward the data message in which the address information is deleted to the switching node which supports service chain routing;

the binding relationship is an address tunnel binding relationship configured for the first relay node, the second relay node and the next-hop node in a manner of pre-configuring for the switching node or in a manner of sending by the network control node a notice to the switching node;

or, the binding relationship is an address tunnel binding relationship set for the first relay node, the second relay node and the next-hop node by the network control node in a manner of modifying service chain routing information.

10. The method as claimed in claim 9, before receiving, by the first relay node, the data message forwarded by the switching node, comprising:

receiving, by the first relay node, the address information of the second relay node from a network control node.

11. The method as claimed in claim 9, before receiving, by the first relay node, the address information of the second relay node from the network control node, comprising:

finding, by the switching node, that the data message contains a service chain identifier, and determining, according to the service chain routing information, that the next-hop node does not support service chain routing;

sending, by the switching node, an event report to the network control node; and allocating, by the network control node, the first relay node and the second relay node to the next-hop node according to a network topology, wherein the second relay node refers to a relay node directly connected with the switching node which supports service chain routing.

12. The method as claimed in claim 11, wherein, when the second relay node is not administered by the network control node, the network control node sends an allocation request to a network control node which administers the second relay node to obtain a right of using the second relay node and the address information of the second relay node.

13. A service chain routing system, comprising: a service orchestration node, a network control node, a switching node, a service node, a first relay node and a second relay node, wherein the first relay node comprises:

a first receiving component, configured to receive a data message forwarded by the switching node, wherein the data message is a message sent to a next-hop node which does not support service chain routing, and the first relay node forms a binding relationship with the next-hop node;

a first processing component, configured to, after determining that a type of the next-hop node is a switching node, encapsulate address information of the second relay node in the data message, wherein the second relay node forms a binding relationship with the next-hop node; and a second processing component, configured to send the data message in which the address information is encapsulated to the second relay node, as to the second relay node to delete the address information in the received data message and forward the data message in which the address information is deleted to the switching node which supports service chain routing;

the binding relationship is an address tunnel binding relationship configured for the first relay node, the second relay node and the next-hop node in a manner of pre-configuring for the switching node or in a manner of sending by the network control node a notice to the switching node;

or, the binding relationship is an address tunnel binding relationship set for the first relay node, the second relay node and the next-hop node by the network control node in a manner of modifying service chain routing information.

14. The system as claimed in claim 13, wherein the first relay node further comprises:

a second receiving component, configured to receive the address information of the second relay node from the network control node.

15. The system as claimed in claim 13, wherein the switching node comprises:

a determination component, configured to find that the data message contains a service chain identifier, and determine, according to the service chain routing information, that the next-hop node does not support service chain routing; a first sending component, configured to send an event report to the network control node; and the network control node comprises:

an allocation component, configured to allocate the first relay node and the second relay node to the next-hop node according to a network topology, wherein the second relay node refers to a relay node directly connected with the switching node which supports service chain routing.

16. The system as claimed in claim 15, wherein the network control node further comprises:

a second sending component, configured to, when the second relay node is not administered by the network control node, send an allocation request to a network control node which administers the second relay node to obtain a right of using the second relay node and the address information of the second relay node.

* * * * *